Patented Oct. 9, 1923.

1,470,260

UNITED STATES PATENT OFFICE.

JOSEPH W. EMERSON, OF SALIDA, COLORADO.

HARDENED WATER-REPELLENT GYPSUM PLASTER AND METHOD FOR PRODUCING THE SAME.

No Drawing.  Application filed August 15, 1921.  Serial No. 492,478.

*To all whom it may concern:*

Be it known that I, JOSEPH W. EMERSON, a citizen of the United States, residing at Salida, county of Chaffee, and State of Colorado, have invented certain new and useful Improvements in Hardened Water-Repellent Gypsum Plaster and Methods for Producing the Same; and I do declare the following to be a full, clear, and exact description of the invention, such as will enable others skilled in the art to which it appertains to make and use the same.

My invention relates to a gypsum product which is waterproof and also harder or stronger than ordinary gypsum plaster.

In my application Serial No. 481,083 filed June 28, 1921, I have described one method for the production of a waterproof gypsum product, and I have also pointed out that ordinarily much difficulty is encountered in the production of a satisfactory waterproof gypsum product, owing to the fact that most waterproofing substances have a more or less injurious effect on gypsum plaster, rendering it softer or non-coherent. Although the gypsum products specified in my previous application Serial Nunber 481,083 are not appreciably softer than ordinary gypsum plaster, yet they are no harder or stronger.

The present invention differs from my other invention in this, that it relates to a gypsum product which is not only waterproof but also is very much harder and stronger than ordinary gypsum plaster.

Gypsum plaster consists essentially of an interwoven aggregate of crystals of hydrous calcium sulphate ($CaSO_4 2H_2O$), between and among which are minute pores or spaces. The present invention depends upon the fact, discovered by me, that if these pores or spaces in the gypsum plaster are partly (or more or less completely) filled with sulphur or with a substance in which sulphur is an essential ingredient, under suitable conditions the plaster will be both waterproof and hard.

Thus, if a piece of ordinary gypsum plaster is dipped in a bath of molten sulphur, under suitable conditions, a certain amount of the molten sulphur will be absorbed into the pores of the plaster, and on cooling, the plaster will be found to be non-absorbent of water and very hard, so hard indeed that it will take a fine polish and cannot be scratched with the finger nail as can ordinary gypsum plaster. It is to be noted that it is not necessary to have the pores of the gypsum plaster completely filled with sulphur; if they are only partly filled, the plaster will be rendered non-absorbent of water and waterproof, because of the strong water-repellent properties of the sulphur. For the best results in hardening effect it is desirable that the sulphur be present in a coherent form, rather than in a powdery form.

Certain difficulties and disadvantages are encountered in the method of impregnating gypsum plaster with sulphur by merely dipping the gypsum product in a bath of molten sulphur. In the first place, molten sulphur is not readily absorbed by gypsum plaster under ordinary conditions; and in the second place, the temperature at which sulphur melts (about 113 degrees C.) is nearly the same as that at which gypsum begins to dehydrate (usually given as 230 degrees F. or 110 degrees C.). Of course in such a case as this it is necessary that the gypsum product be heated at least to the melting temperature of sulphur, either in the bath or before it is introduced into the bath, as otherwise the molten sulphur would "freeze" on the surface of the gypsum plaster and there would be no absorption whatever. But at this temperature, as stated, gypsum begins to dehydrate, and the escaping steam and moisture, filling the pores and spaces, hinders the absorption of sulphur. Unless the gypsum is left at this temperature for a considerable time, however, there would not be any noticeable injury to the plaster on account of the small amount of dehydration at this temperature. In other words, dehyrdration is objectionable chiefly because it hinders absorption of sulphur.

These difficulties may be obviated as follows:

First, the absorbing power of gypsum plaster for molten sulphur may be increased by incorporating within the mass of plaster some substance or substances which will have an attraction for sulphur, such as sulphur itself, carbon disulphide or turpentine. Thus, I have found that the presence of a small amount of sulphur in the gypsum plaster, which has been introduced into the plaster either in a finely divided state; mixed with the dry and powdered calcined gypsum before water is added for a set, or else introduced after the plaster has set by means of solution in carbon disulphide or other solvent, or by any other means, has a marked effect in increasing the absorption of molten sulphur by the mass of plaster thus treated. Also I have found that carbon disulphide ($CS_2$) alone, even in such very small amounts as would be secured by merely subjecting the plaster to the fumes or vapor of carbon disulphide, increases the absorbing power of the plaster for molten sulphur, as does also turpentine and various oils.

The tendency of the gypsum to dehydrate at the temperature of molten sulphur may be overcome to a greater or less extent by conducting the operation under pressure. I have found, however, that a very simple, inexpensive and effective method of obviating this tendency of the gypsum to dehydrate in the molten sulphur is to add to the sulphur some substance or substances which will lower the melting point thereof to a point below the effective dehydration temperature of gypsum. For this purpose I find that turpentine serves well, and when a small amount, say 5%, is added to the sulphur, it not only lowers the melting point of the sulphur, but also renders it more liquid and limpid, so that it is absorbed more readily and rapidly by the gypsum plaster. In this case there is probably a more or less complex reaction between the compounds of the turpentine and the sulphur. After cooling, the resulting product is not pure sulphur but a substance consisting largely of sulphur in which other products are held probably in the nature of "solid solution." However, this does not result in any appreciable alteration in the desirable qualities of the final gypsum product so treated.

It is to be noted that virtually the same product—that is, a gypsum product, the pores of which are partly, or more or less completely, filled with sulphur or a substance in which sulphur is an essential ingredient, may be produced by various other methods than those above described; as, for example, by subjecting the gypsum plaster to sulphur vapor or by blowing or forcing sulphur vapor into the gypsum plaster, so that the sulphur would be solidified within the mass of gypsum in such manner as to be coherent. Sulphur may be introduced into a mass of gypsum plaster by treating the plaster with a sulphur-bearing solution, such as a solution of sulphur in carbon disulphide, after which the solvent is evaporated or otherwise removed, leaving deposited sulphur. This operation might be repeated any number of times to increase the quantity of sulphur deposited within the mass. The sulphur introduced by carbon disulphide solution, however, is in a more or less finely divided state after the solvent is removed, and is rather non-coherent. Although it may in this form lend some water-proofing qualities to the plaster, on account of the water-repellent power of the sulphur, yet it does not lend much added hardness or strength till the sulphur is made more coherent, which may be accomplished by applying heat up to the melting point of sulphur, or by chemical means. The application of heat may be carried out under pressure to prevent dehydration of the gypsum, if desired.

Another method of water proofing gypsum plaster by means of sulphur would be to apply powdered sulphur on the surface of the gypsum plaster, and then to apply heat to melt the sulphur for absorption. The heat could be applied by a hot iron moving over the surface. Instead of powdered sulphur, a paste or paint made of powdered sulphur and turpentine or other suitable liquid might be used and then the heat applied as before. In this way a plastered wall could be weatherproofed.

Also it is to be noted that not only gypsum plaster, but also Portland cement products and many other products of similar nature might be rendered waterproof by partly or completely filling the pores with sulphur or a substance in which sulphur is an essential ingredient.

Having thus described my invention or discovery and the best manner in which I have contemplated using the same, what I claim is:

1. An article of manufacture comprising "set" or hydrous gypsum plaster, the pores of which are substantially filled with sulphur.

2. An article of manufacture comprising "set" or hydrous gypsum plaster, the pores of which are substantially filled with sulphur in coherent form.

3. An article of manufacture comprising "set" or hydrous gypsum plaster, the pores of which are substantially filled with a material containing sulphur as an essential ingredient.

4. An article of manufacture comprising "set" or hydrous gypsum plaster a portion of the pores of which are substantially filled with sulphur.

5. An article of manufacture comprising "set" or hydrous gypsum plaster a portion of the pores of which are substantially filled with sulphur in coherent form.

6. The method of waterproofing plaster which comprises subjecting the plaster to the action of molten sulphur and at the same time maintaining it under sufficient pressure to prevent dehydration of the plaster.

7. The method of waterproofing set plaster of Paris which comprises subjecting the set plaster of Paris to the action of molten sulphur and at the same time maintaining it under sufficient pressure to prevent dehydration of the set plaster of Paris.

8. The method of producing a waterproof gypsum plaster which comprises incorporating with the mass of plaster a substance having an attraction for sulphur and subjecting the resultant plaster to the action of molten sulphur.

9. The method of producing a water-proof plaster which comprises incorporating with the mass of plaster a substance having an attraction for sulphur and subjecting the resultant plaster to the action of molten sulphur.

10. The method of producing a waterproof plaster which comprises incorporating with the mass of plaster a substance having an attraction for sulphur and subjecting the resultant plaster to the action of molten sulphur to which turpentine has been added.

11. The method of producing a waterproof plaster which comprises incorporating with the mass of plaster a substance having an attraction for sulphur and subjecting the resultant plaster to the action of molten sulphur to which substantially five per cent of turpentine has been added.

12. The method of producing a waterproof gypsum plaster which comprises incorporating sulphur with the mass of the plaster to increase its sulphur absorbing power and subjecting the resultant plaster to the action of sulphur in a liquid state.

13. The method of producing a waterproof gypsum plaster which comprises incorporating sulphur with the mass of the plaster to increase its sulphur absorbing power and subjecting the resultant plaster to the action of sulphur in a molten state.

14. The method of producing a waterproof gypsum plaster which comprises incorporating sulphur with the mass of the plaster to increase its sulphur absorbing power and subjecting the resultant plaster to the action of sulphur in a molten state, and of a temperature substantially less than the dehydrating temperature of gypsum.

15. The method of producing a waterproof plaster which comprises incorporating with the mass of plaster a substance having an attraction for sulphur and subjecting the resultant plaster to the action of sulphur to which a substance has been added which has the effect of lowering the melting point thereof.

In testimony whereof I affix my signature.

JOSEPH W. EMERSON.